Patented June 9, 1936

2,043,825

UNITED STATES PATENT OFFICE 2,043,825

MANUFACTURE OF SYNTHETIC RESINS

Henry G. Berger, Woodbury, N. J., assignor to Socony-Vacuum Oil Company, Incorporated, New York, N. Y., a corporation of New York No Drawing. Application January 26, 1935, Serial No. 3,649

4 Claims. (Cl. 260—2)

This invention relates to the manufacture of synthetic resins by the use of petrolatum as the basic material. The object of the invention is, primarily, the production of hard, infusible and insoluble resins suitable for molding under combined heat and pressure, and, secondarily, to provide for the economical utilization of the petrolatum which is produced, in excess of other requirements, as a by-product in the manufacture of petroleum lubricating oils.

It is known that petrolatum, among other hydrocarbon materials, may be converted, in part, into resinous substances by first chlorinating it and then subjecting it to a polymerizing or condensing reaction through contact with aluminum chloride or the like. In accordance with my method, however, I do not chlorinate or otherwise modify the petrolatum prior to the condensing reaction. In place of so doing, I add to the reaction mixture a volatile chlorinated hydrocarbon, such as carbon tetrachloride, which serves not only as a solvent for the petrolatum, but also as a conveyor for the chlorine which promotes the condensing reaction and also enters into the final composition of the resin. I have discovered that when working in this manner the product is a hard resin, of superior character for use in molding compositions, which is insoluble in all ordinary solvents and will become plastic when heated to about 106° C., but will not melt at any temperature below that at which it decomposes. Furthermore, the production of the resin in this manner is simplified by the fact that, if the chlorinated volatile hydrocarbon has been used in, or in excess of, equivalent proportion with the petrolatum, the decomposition of the reaction complex by the addition of water causes the resin to separate in solid form, needing only to be ground and washed to prepare it in sufficiently pure condition for use.

In place of carbon tetrachloride, I have found that chlorinated naphtha, chlorinated petroleum propane or penta-chlor butane may be used with substantially the same effect. Anhydrous aluminum chloride is the catalyst most economically available for use in my process, but the other active metal halides well known to produce similar condensing reactions may be used if preferred.

As an example of my process, 100 parts, by weight, of petrolatum may be heated with 100 parts of anhydrous aluminum chloride, to a temperature of 80° C., and 100 parts of carbon tetrachloride added slowly. The mixture is heated until the evolution of gas ceases, and water or dilute hydrochloric acid is then added, and the mixture is stirred until it separates into solid resin and a water solution. The wet resin may then be ground, washed with water and dried. The yield of resin is about 94 parts.

In the example just given the petrolatum and the carbon tetrachloride are in approximately molecular proportion and are substantially all consumed. It is usually more convenient to use the carbon tetrachloride in considerable excess, as, for example, 15 or 16 parts to one part of petrolatum. In this case the excess of the tetrachloride may be recovered by decantation, prior to the addition of water to the reaction complex. I have not determined the molecular proportions for the other volatile chlorinated hydrocarbons, but either of them may be used in excess, as in the case of the carbon tetrachloride, and the excess recovered in the same way. In each case the yield of resin will be based on the quantity of petrolatum and will be approximately the same as in the given example, and the resin will have the same characteristics.

The resins produced by this method are brittle, when used alone, having a conchoidal fracture and a dark brown color, and they contain substantial quantities of chlorine, of the order of 3% to 13% or more. When mixed with wood flour or other inert fillers they constitute excellent molding compositions, for forming under combined heat and pressure.

This application is a continuation, in part, of my application filed July 3, 1934. Serial No. 733,605.

I claim as my invention:

1. The method of manufacturing a hard, heat-plastic insoluble resin, which comprises the steps of reacting petrolatum with volatile chlorinated hydrocarbon material selected from the class consisting of carbon tetrachloride, chlorinated petroleum naphtha, chlorinated propane and penta-chlor butane, in the presence of an active metal halide, and separating the resulting resinous product from water-soluble substances.

2. The method of manufacturing a hard, heat-plastic insoluble resin, which comprises the steps of reacting petrolatum with at least a substantially equal weight of carbon tetrachloride, in the presence of an active metal halide, until the petrolatum is substantially all condensed, and decomposing the reaction complex and washing the resultant resin with water.

3. The method set forth in claim 1, as practiced with the said volatile chlorinated hydrocarbon material in substantial excess of equivalent proportion with the petrolatum.

4. The method of manufacturing a hard, heat-plastic resin, which comprises the steps of reacting petrolatum with a chlorinated volatile hydrocarbon in the presence of an active metal halide until the petrolatum is substantially all condensed, and decomposing the reaction complex and washing the resultant resin with water.

HENRY G. BERGER.